US009584739B2

United States Patent
Tay

(10) Patent No.: US 9,584,739 B2
(45) Date of Patent: Feb. 28, 2017

(54) CMOS IMAGE SENSOR WITH PROCESSOR CONTROLLED INTEGRATION TIME

(76) Inventor: Hiok Nam Tay, Singapore (SG)

(*) Notice: Subject to any disclaimer, the term of this patent is extended or adjusted under 35 U.S.C. 154(b) by 1210 days.

(21) Appl. No.: 12/893,032

(22) Filed: Sep. 29, 2010

(65) Prior Publication Data

US 2011/0013045 A1   Jan. 20, 2011

Related U.S. Application Data

(63) Continuation of application No. 10/383,450, filed on Mar. 6, 2003, now abandoned.

(60) Provisional application No. 60/372,902, filed on Apr. 16, 2002.

(51) Int. Cl.
| | |
|---|---|
| *H04N 5/335* | (2011.01) |
| *H04N 3/14* | (2006.01) |
| *H04N 5/343* | (2011.01) |
| *H04N 5/345* | (2011.01) |
| *H04N 5/353* | (2011.01) |
| *H04N 5/355* | (2011.01) |
| *H04N 5/357* | (2011.01) |

(52) U.S. Cl.
CPC ........... *H04N 5/343* (2013.01); *H04N 5/3454* (2013.01); *H04N 5/3535* (2013.01); *H04N 5/3575* (2013.01); *H04N 5/35581* (2013.01)

(58) Field of Classification Search
CPC ...................................................... H04N 5/335
USPC ................................. 348/294–310; 250/208.1
See application file for complete search history.

(56) References Cited

U.S. PATENT DOCUMENTS

| | | | | |
|---|---|---|---|---|
| 4,441,125 | A * | 4/1984 | Parkinson | 348/302 |
| 5,877,715 | A * | 3/1999 | Gowda et al. | 341/122 |
| 6,522,357 | B2 * | 2/2003 | Beiley et al. | 348/296 |
| 2001/0040635 | A1 * | 11/2001 | Fossum et al. | 348/308 |
| 2002/0085106 | A1 * | 7/2002 | Beiley | H04N 5/3595 348/296 |

* cited by examiner

*Primary Examiner* — Anthony J Daniels

(57) ABSTRACT

An image sensor that has one or more pixels within a pixel array. The pixels are arranged within a plurality of rows within the array. Each row of the pixel array can be selected by a row decoder in response to an edge of a control signal. The control signal may be one of a plurality of signals generated by a processor coupled to the image sensor. The processor can control the exposure time of the pixels by varying the control signals. The control signals may also have an embedded narrow pulse that is used to determine the location of a "window" in the pixel array.

14 Claims, 14 Drawing Sheets

In draft mode, 1 of every 6 rows is read out. Draft mode is either full-frame or windowed. Full-frame draft mode is used for real-time LCD display. Windowed draft mode is used for auto-focus. Two windowed draft modes are provided:

AF1 - 106 lines read out, and
  AF2 - 36 lines read out.

In full-frame, 256 lines are read.

CMOS IMAGE SENSOR WITH PROCESSOR CONTROLLED INTEGRATION TIME

CROSS-REFERENCE TO RELATED APPLICATIONS

This application is a continuation of U.S. patent application Ser. No. 10/383,450 filed on Mar. 6, 2003, which claims priority to U.S. Provisional Application No. 60/372,902 filed on Apr. 16, 2002.

REFERENCE TO CROSS RELATED APPLICATION

This application claims priority under 35 U.S.C. §119(e) to provisional application No. 60/372,902 filed on Apr. 16, 2002.

BACKGROUND OF THE INVENTION

1. Field of the Invention

The subject matter disclosed generally relates to the field of semiconductor image sensors.

2. Background Information

Photographic equipment such as digital cameras and digital camcorders contain electronic image sensors that capture light for processing into a still or video image, respectively. There are two primary types of electronic image sensors, charge coupled devices (CCDs) and complimentary metal oxide semiconductor (CMOS) sensors. CCD image sensors have relatively high signal to noise ratios (SNR) that provide quality images. Additionally, CCDs can be fabricated to have pixel arrays that are relatively small while conforming with most camera and video resolution requirements. A pixel is the smallest discrete element of an image. For these reasons, CCDs are used in most commercially available cameras and camcorders.

CMOS sensors are faster and consume less power than CCD devices. Additionally, CMOS fabrication processes are used to make many types of integrated circuits. Consequently, there is a greater abundance of manufacturing capacity for CMOS sensors than CCD sensors.

To date there has not been developed a CMOS sensor that has the same SNR and pixel pitch requirements as commercially available CCD sensors. Pixel pitch is the space between the centers of adjacent pixels. It would be desirable to provide a CMOS sensor that has relatively high SNR while providing a commercially acceptable pixel pitch.

The image sensor is typically connected to an external processor and external memory. The external memory stores data from the image sensor. The processor processes the stored data. The data includes one or more images generated by exposing the pixels for a predetermined time interval. The exposure time of the pixels is typically controlled by an internal clock(s) of the image sensor.

The exposure time of a picture frame is established by a word written into an exposure time register. Changing the exposure time requires writing new data into the register and then reading the data. In video and fast successive still photo shots this technique may create confusion regarding the exposure time of incoming pixel data, thereby creating instability in the system. It would be desirable to provide processor control of the exposure time of the pixels that improves stability and does not require an undesirable number of pins and signals.

Camera or camcorder products typically have an auto-focus function. To increase the speed of an auto-focus cycle the camera may be designed to process only a "window" of the pixel array. The auto-focus routine may require the window to move around the pixel array of the image sensor. It would be desirable to provide processor control of the window data in a manner that minimizes the pin count and number of signals required for the image sensor.

BRIEF SUMMARY OF THE INVENTION

An image sensor coupled to a process that generates a plurality of control signals. The image sensor includes a pixel array that is arranged into a number of rows. The sensor may also contain a logic circuit that selects a row of the pixel array to generate and retrieve pixel data in response to a first edge and a second edge of the control signals. A time interval between a resetting and a reading of the selected row is proportional to an interval between the first and second edges of the control signals.

DETAILED DESCRIPTION

Disclosed is an image sensor that has one or more pixels within a pixel array. The pixels are arranged within a plurality of rows within the array. Each row of the pixel array can be selected by a row decoder in response to an edge of a control signal. The control signal may be one of a plurality of signals generated by a processor coupled to the image sensor. The processor can control the exposure time of the pixels by varying the control signals. The control signals may also have an embedded narrow pulse that is used to determine the location of a "window" in the pixel array.

The pixel may be a three transistor structure that minimizes the pixel pitch of the image sensor. The entire image sensor is preferably constructed with CMOS fabrication processes and circuits. The CMOS image sensor has the characteristics of being high speed, low power consumption, small pixel pitch and a high SNR.

Figure 1:
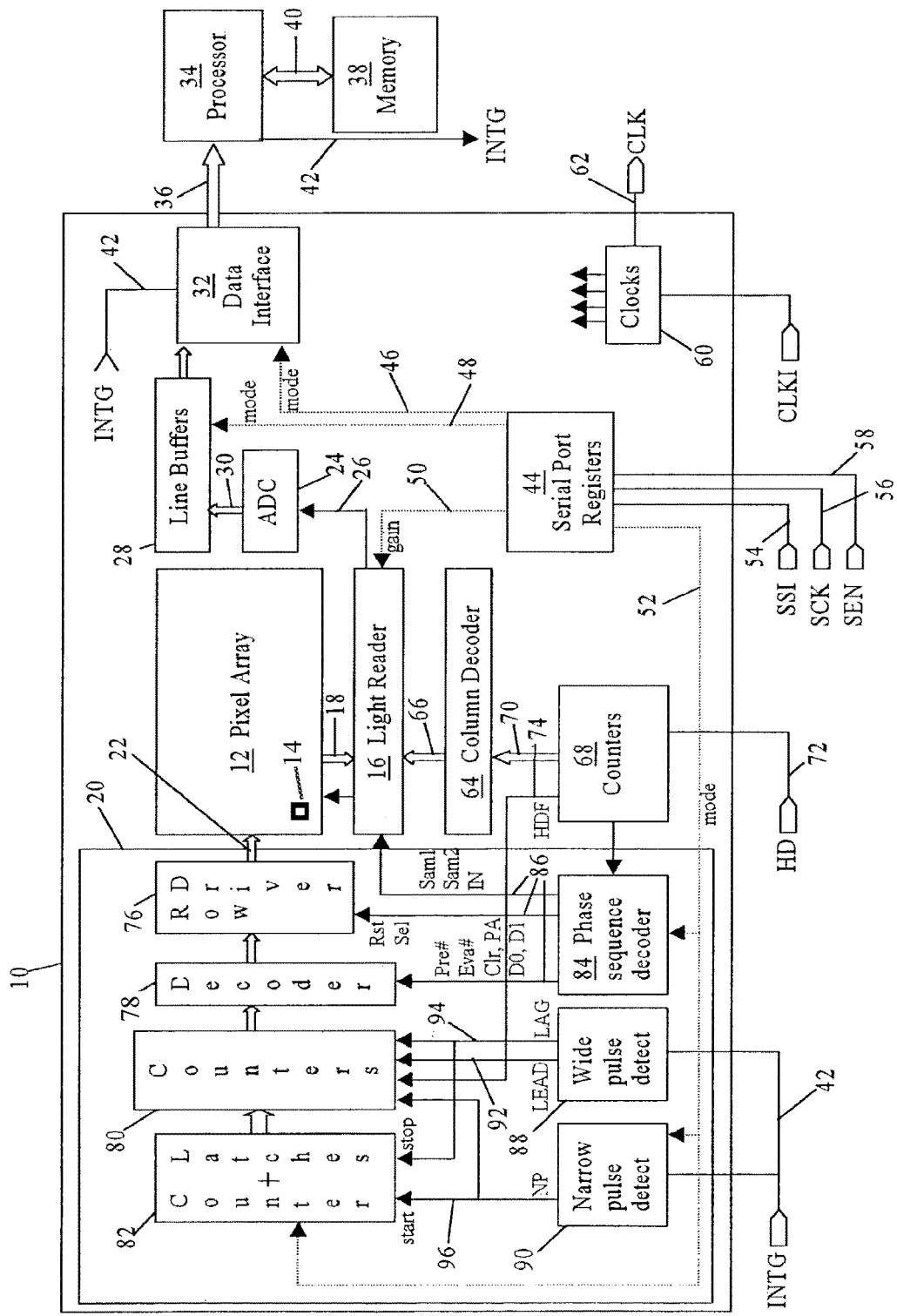
FIG. 1 is a schematic of an embodiment of an image sensor.

Referring to the drawings more particularly by reference numbers, FIG. 1 shows an image sensor 10. The image sensor 10 includes a pixel array 12 that contains a plurality of individual photodetecting pixels 14. The pixels 14 are arranged in a two-dimensional array of rows and columns.

The pixel array 12 is coupled to a light reader circuit 16 by a bus 18 and to a row decoder 20 by control lines 22. The row decoder 20 can select an individual row of the pixel array 12. The light reader 16 can then read specific discrete columns within the selected row. Together, the row decoder 20 and light reader 16 allow for the reading of an individual pixel 14 in the array 12.

The light reader 16 may be coupled to an analog to digital converter 24 (ADC) by output line(s) 26. The ADC 24 generates a digital bit string that corresponds to the amplitude of the signal provided by the light reader 16 and the selected pixels 14.

The ADC 24 may be coupled to line buffers 28 by data lines 30. The line buffers 28 may include separate pairs of buffers for first image data and second image data. The line buffers 28 are coupled to a data interface 32 that transfers data to a processor 34 over bus 36. The processor 34 may be coupled to memory 38 by bus 40. Although the memory 38 is shown coupled to the processor 34, it is to be understood that the system may have other configurations. For example, the processor 34 and memory 38 may be coupled to the interface 32 by separate busses.

The data interface 32 may be connected to a control line INTG 42 which provides a control signal from the processor 34. The control signal may contain a series of pulses that control the transfer of data to the processor 34. The pixel data may be transferred to the processor 34 in an interleaving manner. For example, the buffers 28 may store pixel data of a first image and a second image. The data interface 32 may interleave the data by sending a first line of the first image and then a first line of the second image and so forth and so on.

The image sensor 10 may have registers 44 that store mode and gain values. The values can be provided to the data interface 32, buffers 28, light reader 16 and row decoder 20 over lines 46, 48, 50 and 52, respectively. The values can be loaded into the registers 44 through lines 54, 56 and 58. The image sensor 10 may also have clock circuits 60 that provide CLK timing signals over line 62.

The light reader circuit 16 may be coupled to a column decoder 64 by control lines 66. The decoder 64 selects a column within the pixel array 12 to generate and retrieve pixel data from the pixels 14. The decoder 64 is coupled to a counter 68 by a bus 70. The counter 68 provides a count value that causes the decoder 64 to switch the selection of a column in the pixel array 12. Counter 68 is also connected to an input line HD 72 and an output line HDF 74.

The row decoder 20 may include a plurality of row drivers 76 that are coupled to the pixel array 12. The row drivers 76 may be coupled to decoders 78 and counters 80. The counters 80 may be coupled to a counter/latch circuit 82.

The row decoder 20 may also include a phase sequence decoder 84. The phase sequence decoder 84 may be coupled to the light reader 16, row drivers 76 and decoders 78 by control signals 86. The row decoder 20 may further include a wide pulse detector 88 and a narrow pulse detector 90. The wide pulse detector 88 may be connected to the counters 80 by LEAD 92 and LAG 94 control signals, respectively. The narrow pulse detector 90 may be connected to the counter/latch 82 by control signal NP 96. The pulse detectors 88 and 90 may be connected to the INTG control line 42 that is coupled to the processor 34. The counter/latch 82, narrow pulse detector 90 and phase sequence decoder 84 may be connected to the mode line 52 of register 44.

Figure 2:
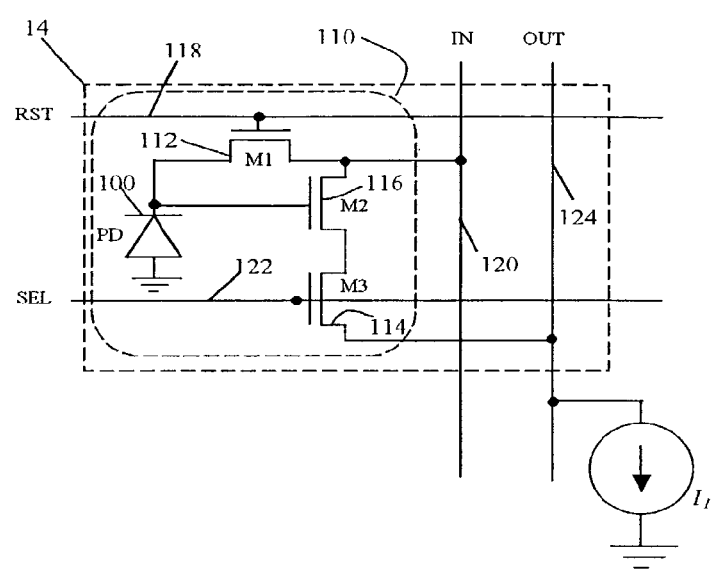
FIG. 2 is a schematic of an embodiment of a pixel of the image sensor.

FIG. 2 shows an embodiment of a cell structure for a pixel 14 of the pixel array 12. The pixel 14 may contain a photodetector 100. By way of example, the photodetector 100 may be a photodiode. The photodetector 100 may be connected to a reset transistor 112. The photodetector 100 may also be coupled to a select transistor 114 through a level shifting transistor 116. The transistors 112, 114 and 116 may be field effect transistors (FETs).

The gate of reset transistor 112 may be connected to a RST line 118. The drain node of the transistor 112 may be connected to IN line 120. The gate of select transistor 114 may be connected to a SEL line 122. The source node of transistor 114 may be connected to an OUT line 124. The RST 118 and SEL lines 122 may be common for an entire row of pixels in the pixel array 12. Likewise, the IN 120 and OUT 124 lines may be common for an entire column of pixels in the pixel array 12. The RST line 118 and SEL line 122 are connected to the row decoder 20 and are part of the control lines 22.

Figure 3:
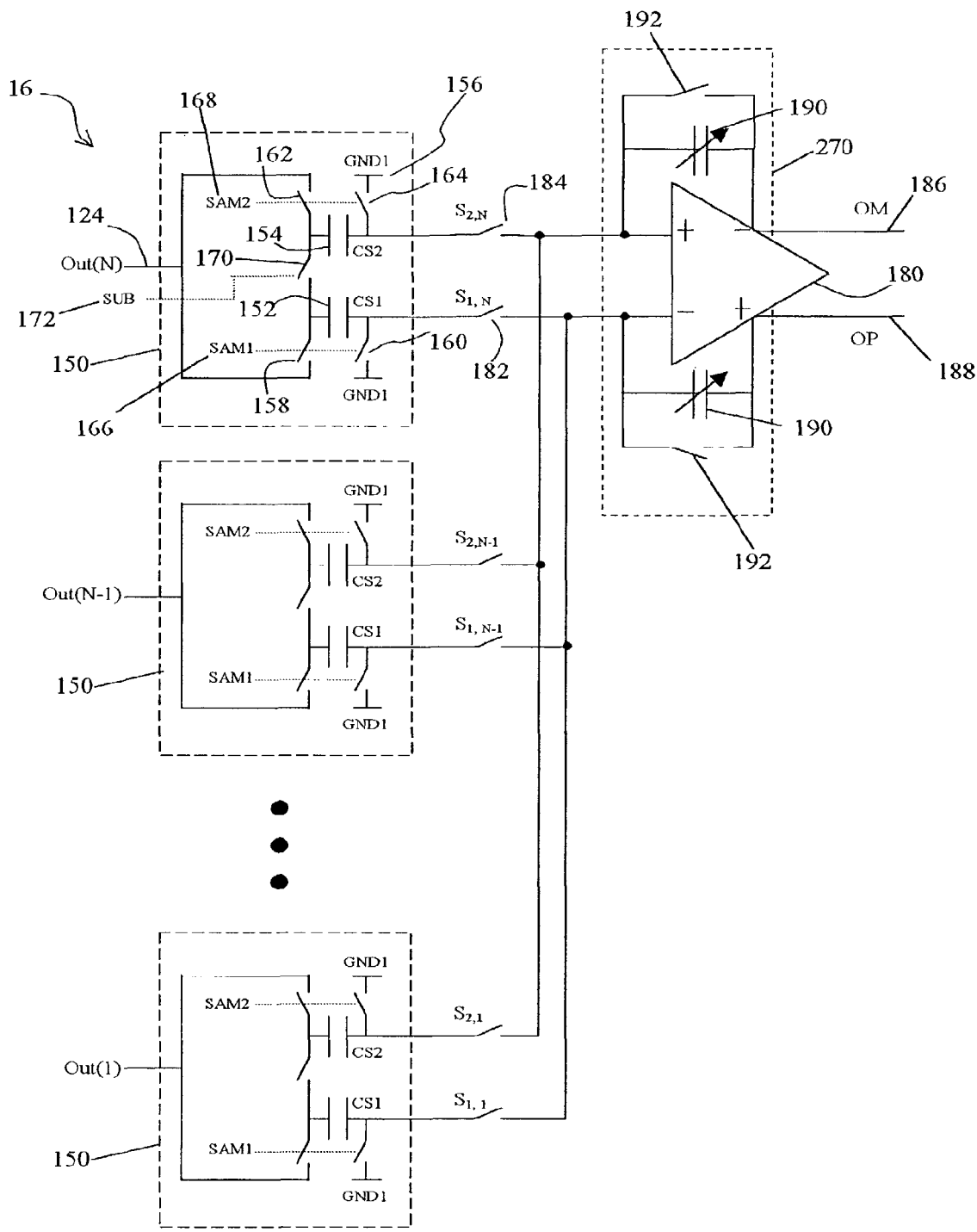
FIG. 3 is a schematic of an embodiment of a light reader circuit of the image sensor.

FIG. 3 shows an embodiment of a light reader circuit 16. The light reader 16 may include a plurality of double sampling capacitor circuits 150 each connected to an OUT line 124 of the pixel array 12. Each double sampling circuit 150 may include a first capacitor 152 and a second capacitor 154. The first capacitor 152 is coupled to the OUT line 124 and ground GND1 156 by switches 158 and 160, respectively. The second capacitor 154 is coupled to the OUT line 124 and ground GND1 by switches 162 and 164, respectively. Switches 158 and 160 are controlled by a control line SAM1 166. Switches 162 and 164 are controlled by a control line SAM2 168. The capacitors 152 and 154 can be connected together to perform a voltage subtraction by closing switch 170. The switch 170 is controlled by a control line SUB 172.

The double sampling circuits 150 are connected to an operational amplifier 180 by a plurality of first switches 182 and a plurality of second switches 184. The amplifier 180 has a negative terminal − coupled to the first capacitors 152 by the first switches 182 and a positive terminal + coupled to the second capacitors 154 by the second switches 184. The operational amplifier 180 has a positive output + connected to an output line OP 188 and a negative output − connected to an output line OM 186. The output lines 186 and 188 are connected to the ADC 24 (see FIG. 1).

The operational amplifier 180 provides an amplified signal that is the difference between the voltage stored in the first capacitor 152 and the voltage stored in the second capacitor 154 of a sampling circuit 150 connected to the amplifier 180. The gain of the amplifier 180 can be varied by adjusting the variable capacitors 190. The variable capacitors 190 may be discharged by closing a pair of switches 192. The switches 192 may be connected to a corresponding control line (not shown). Although a single amplifier is shown and described, it is to be understood that more than one amplifier can be used in the light reader circuit 16.

Figure 4:
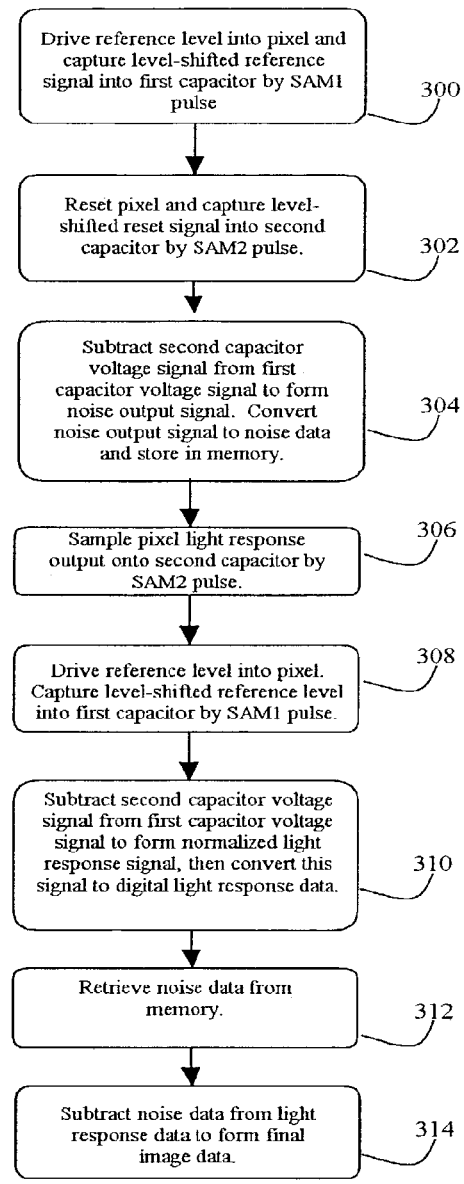
FIG. 4 is a flowchart for a first mode of operation of the image sensor.
Figure 5:
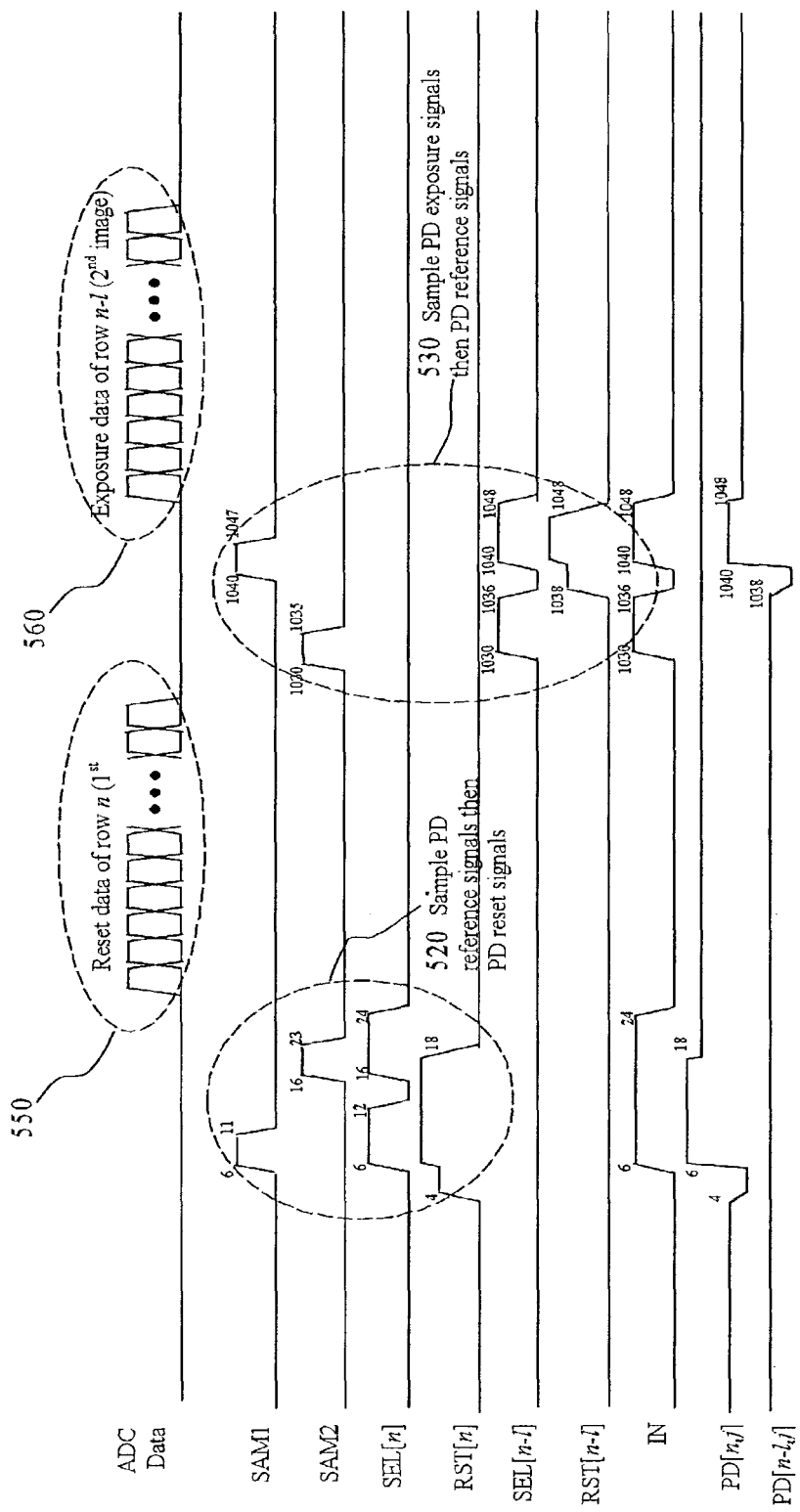
FIG. 5 is a timing diagram for the first mode of operation of the image sensor.

FIGS. 4 and 5 show an operation of the image sensor 10 in a first mode also referred to as a low noise mode. In process block 300 a reference signal is written into each pixel 14 of the pixel array and then a first reference output signal is stored in the light reader 16. Referring to FIGS. 2 and 5, this can be accomplished by switching the RST 118 and IN 120 lines from a low voltage to a high voltage to turn on transistor 112. The RST line 118 is driven high for an entire row. IN line 120 is driven high for an entire column. In the preferred embodiment, RST line 118 is first driven high while the IN line 120 is initially low.

The RST line 118 may be connected to a tri-state buffer (not shown) that is switched to a tri-state when the IN line 120 is switched to a high state. This allows the gate voltage to float to a value that is higher than the voltage on the IN line 120. This causes the transistor 112 to enter the triode region. In the triode region the voltage across the photodiode 100 is approximately the same as the voltage on the IN line 120. Generating a higher gate voltage allows the photodetector to be reset at a level close to Vdd. CMOS sensors of the prior art reset the photodetector to a level of Vdd-Vgs, where Vgs can be up to 1 V.

The SEL line 122 is also switched to a high voltage level which turns on transistor 114. The voltage of the photodiode 100 is provided to the OUT line 124 through level shifter transistor 116 and select transistor 114. The SAM1 control line 166 of the light reader 16 (see FIG. 3) is selected so that the voltage on the OUT line 124 is stored in the first capacitor 152.

Figure 6:
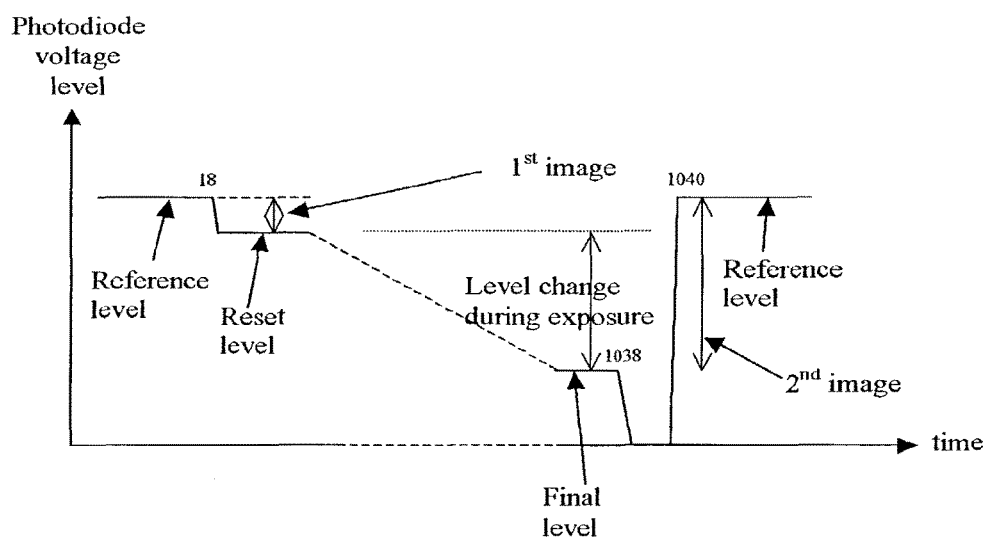
FIG. 6 is a diagram showing the levels of a signal across a photodiode of a pixel.

Referring to FIG. 4, in process block 302 the pixels of the pixel array are then reset and reset output signals are then stored in the light reader 16. Referring to FIGS. 2 and 5 this can be accomplished by driving the RST line 118 low to turn off the transistor 112 and reset the pixel 14. Turning off the transistor 112 will create reset noise, charge injection and clock feedthrough voltage that resides across the photodiode 100. As shown in FIG. 6 the noise reduces the voltage at the photodetector 100 when the transistor 112 is reset.

The SAM2 line 168 is driven high, the SEL line 122 is driven low and then high again, so that a level shifted voltage of the photodiode 100 is stored as a reset output signal in the second capacitor 154 of the light reader circuit 16. Process blocks 300 and 302 are repeated for each pixel 14 in the array 12.

Referring to FIG. 4, in process block 304 the reset output signals are then subtracted from the first reference output signals to create noise output signals that are then converted to digital bit strings by ADC 24. The digital output data can be stored within the line buffers 28 and eventually transferred and stored within the external memory 38. The noise signals may be referred to as a first image. Referring to FIG. 3, the subtraction process can be accomplished by closing switches 182, 184 and 170 of the light reader circuit 16 (FIG. 3) to subtract the voltage across the second capacitor 154 from the voltage across the first capacitor 152.

Referring to FIG. 4, in block 306 light response output signals are sampled from the pixels 14 of the pixel array 12 and stored in the light reader circuit 16. The light response output signals correspond to the optical image that is being detected by the image sensor 10. Referring to FIGS. 2, 3 and 5 this can be accomplished by having the IN 120, SEL 122 and SAM2 lines 168 in a high state and RST 118 in a low state. The second capacitor 152 of the light reader circuit 16 stores a level shifted voltage of the photodiode 100 as the light response output signal.

Referring to FIG. 4, in block 308 a second reference output signal is then generated in the pixels 14 and stored in the light reader circuit 16. Referring to FIGS. 2, 3 and 5, this can be accomplished similar to generating and storing the first reference output signal. The RST line 118 is first driven high and then into a tri-state. The IN line 120 is then driven high to cause the transistor 112 to enter the triode region so that the voltage across the photodiode 100 is the voltage on IN line 120. The SEL 122 and SAM2 168 lines are then driven high to store the second reference output voltage in the first capacitor 154 of the light reader circuit 16. Process blocks 306 and 308 are repeated for each pixel 14 in the array 12.

Referring to FIG. 4, in block 310 the light response output signal is subtracted from the second reference output signal to create a normalized light response output signal. The normalized light response output signal is converted into a digital bit string to create normalized light output data that is transferred to the processor 34. The normalized light response output signals may be referred to as a second image. Referring to FIGS. 2, 3 and 5 the subtraction process can be accomplished by closing switches 170, 182 and 184 of the light reader 16 to subtract the voltage across the first capacitor 152 from the voltage across the second capacitor 154. The difference is then amplified by amplifier 180 and converted into a digital bit string by ADC 24 as light response data.

Referring to FIG. 4, in block 312 the noise data is retrieved from memory 38. In block 314 the noise data, first image, is combined (subtracted) with the normalized light output data, second image, by the processor 34. The noise data corresponds to the first image and the normalized light output data corresponds to the second image. The second reference output signal is the same or approximately the same as the first reference output signal such that the present technique subtracts the noise data, due to reset noise, charge injection and clock feedthrough, from the normalized light response signal. This improves the signal to noise ratio of the final image data.

The process described is performed in a sequence across the various rows of the pixels in the pixel array 12. As shown in FIG. 5, the n-th row in the pixel array may be generating noise signals while the n-l-th row generates normalized light response signals, where l is the exposure duration in multiples of a line period.

Figure 7:
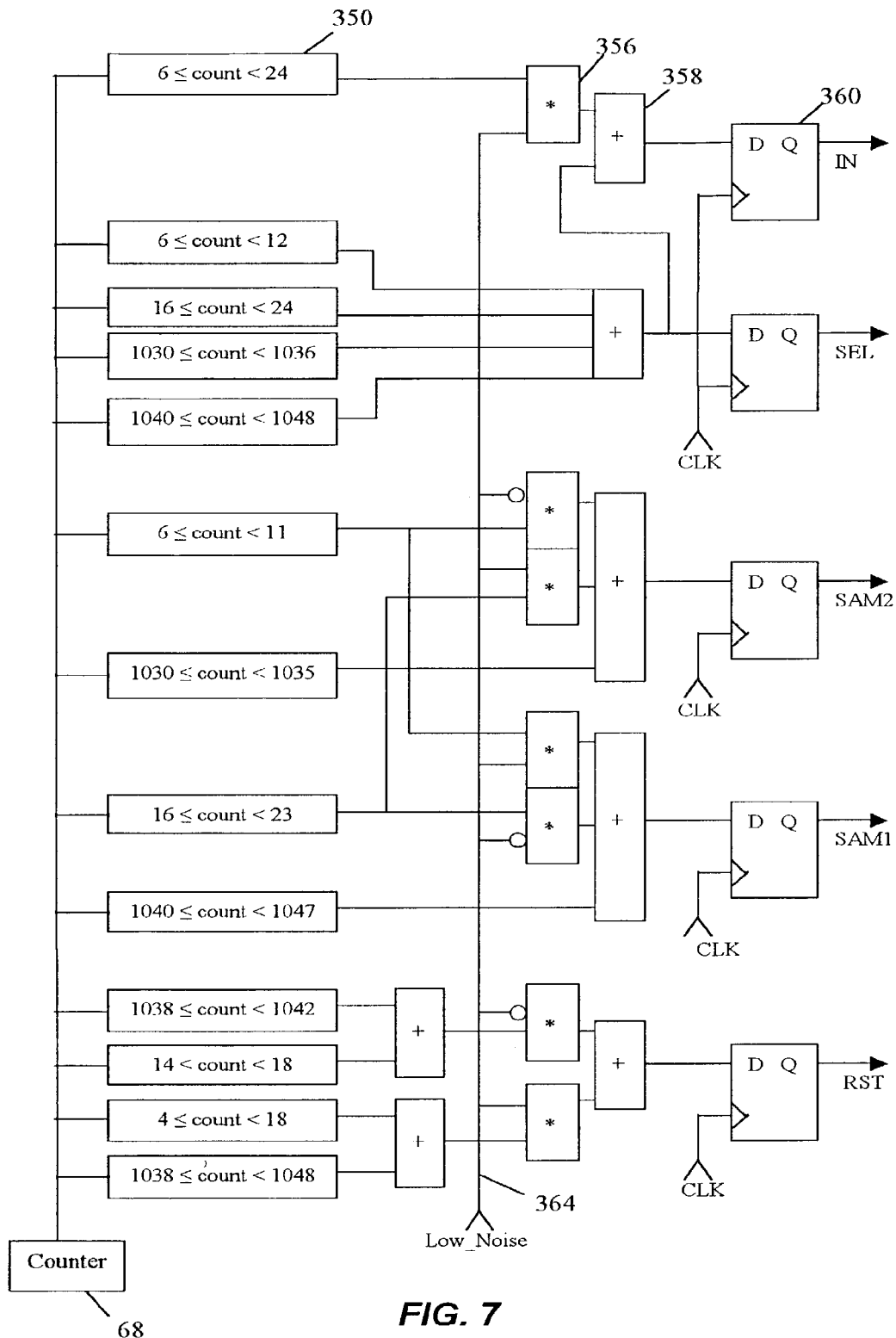
FIG. 7 is a schematic for a logic circuit for generating the timing diagrams of FIG. 5.

The various control signals RST, SEL, IN, SAM1, SAM2 and SUB can be generated in the circuit generally referred to as the phase sequence decoder 84. FIG. 7 shows an embodiment of logic to generate the IN, SEL, SAM1, SAM2 and RST signals in accordance with the timing diagram of FIG. 5. The logic may include a plurality of comparators 350 with one input connected to a counter 68 and another input connected to hardwired signals that contain a lower count value and an upper count value. The counter 68 sequentially generates a count. The comparators 350 compare the present count with the lower and upper count values. If the present count is between the lower and upper count values the comparators 350 output a logical 1.

The comparators 350 are connected to plurality of AND gates 356 and OR gates 358. The OR gates 358 are connected to latches 360. The latches 360 provide the corresponding IN, SEL, SAM1, SAM2 and RST signals. The AND gates 356 are also connected to a mode line 364. To operate in accordance with the timing diagram shown in FIG. 5, the mode line 364 is set at a logic 1.

The latches 360 switch between a logic 0 and a logic 1 in accordance with the logic established by the AND gates 356, OR gates 358, comparators 350 and the present count of the counter 352. For example, the hardwired signals for the comparator coupled to the IN latch may contain a count values of 6 and a count value of 24. If the count from the counter is greater or equal to 6 but less than 24 the comparator 350 will provide a logic 1 that will cause the IN latch 360 to output a logic 1. The lower and upper count values establish the sequence and duration of the pulses shown in FIG. 5. The mode line 364 can be switched to a logic 0 which causes the image sensor to function in a second mode.

Figure 8:
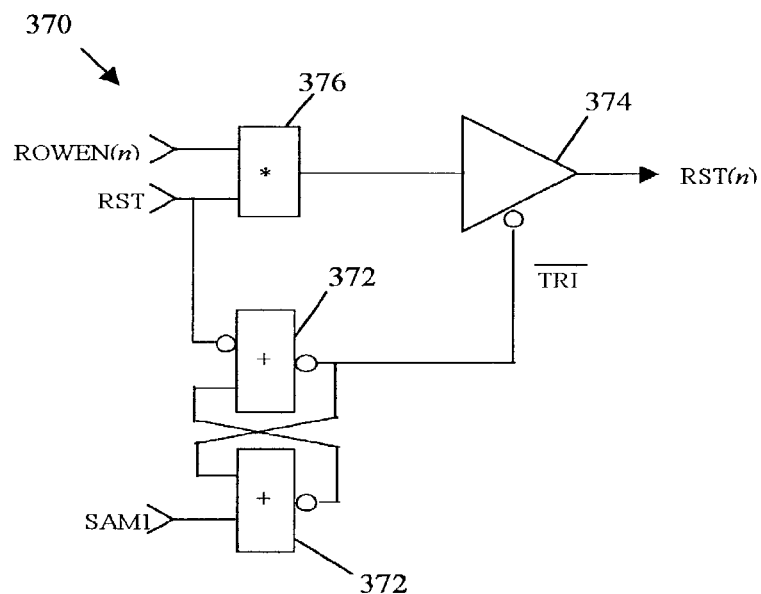
FIG. 8 is a schematic of a logic circuit for generating a RST signal for a row of pixels.
Figure 9:
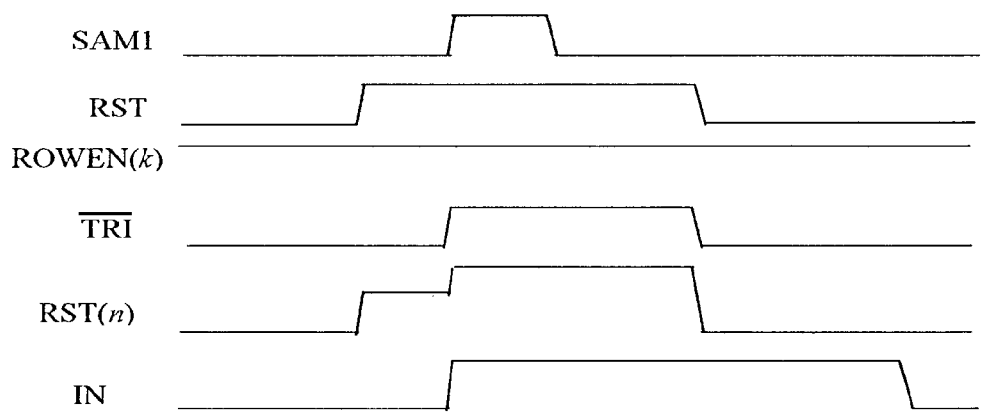
FIG. 9 is a timing diagram for the logic circuit shown in FIG. 8.

The sensor 10 may have a plurality of reset RST(n) drivers 370, each driver 370 being connected to a row of pixels. FIGS. 8 and 9 show an exemplary driver circuit 370 and the operation of the circuit 370. Each driver 370 may have a pair of NOR gates 372 that are connected to the RST and SAM1 latches shown in FIG. 7. The NOR gates control the state of a tri-state buffer 374. The tri-state buffer 374 is connected to the reset transistors in a row of pixels. The input of the tri-state buffer is connected to an AND gate 376 that is connected to the RST latch and a row enable ROWEN(n) line.

Figure 10:
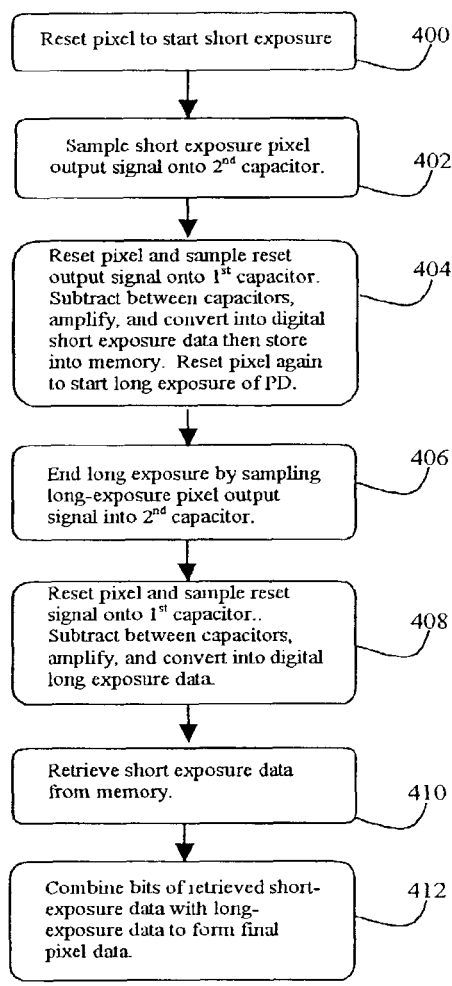
FIG. 10 is a flowchart showing a second mode of operation of the image sensor.
Figure 11:
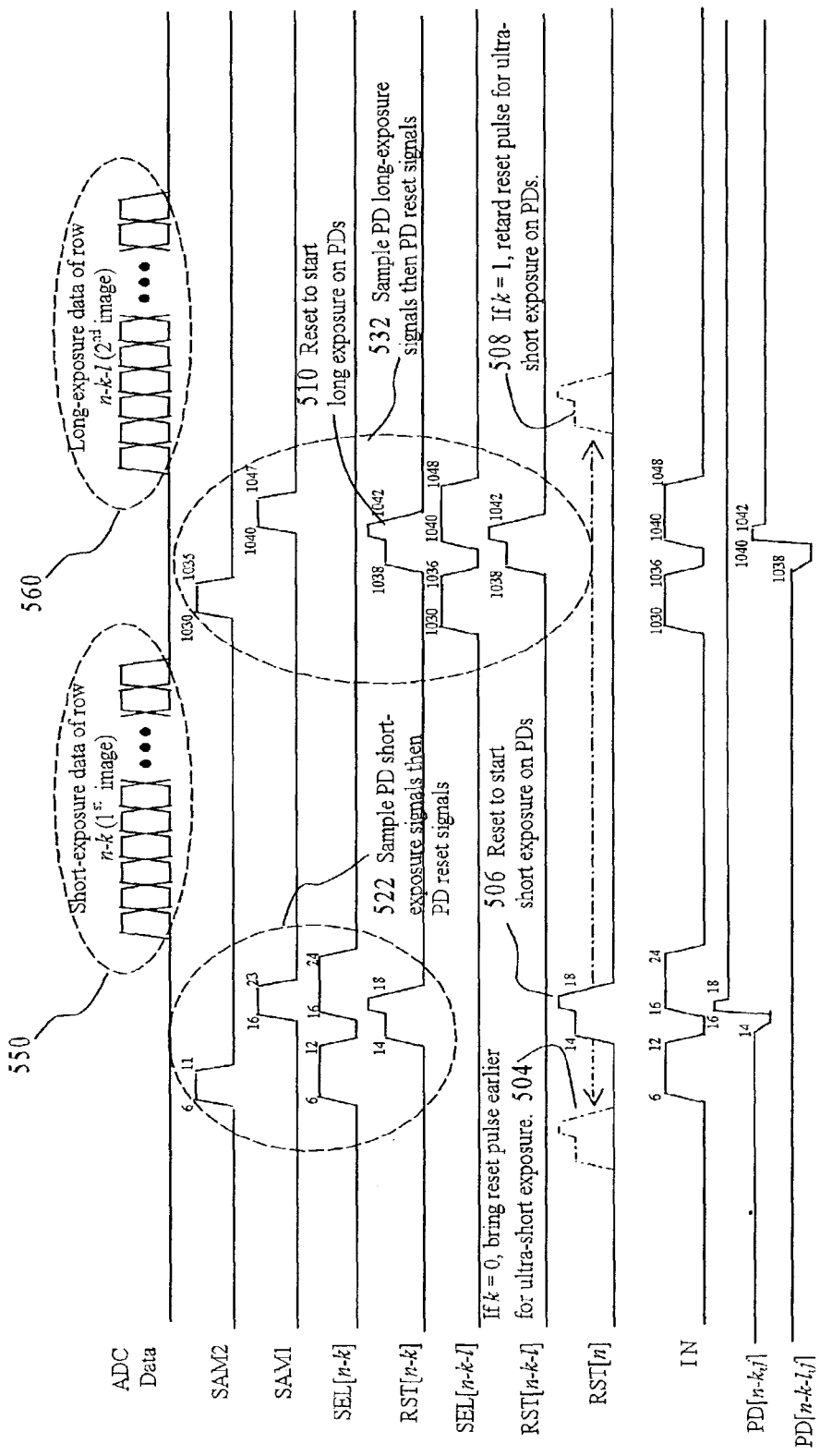
FIG. 11 is a timing diagram for the second mode of operation of the image sensor.

FIGS. 10 and 11 show operation of the image sensor in a second mode also referred to as an extended dynamic range mode. In this mode the image provides a sufficient amount of optical energy so that the SNR is adequate even without the noise cancellation technique described in FIGS. 4 and 5. Although it is to be understood that the noise cancellation technique shown in FIGS. 4 and 5 can be utilized while the image sensor 10 is in the extended dynamic range mode. The extended dynamic mode has both a short exposure period and a long exposure period. Referring to FIG. 10, in block 400 each pixel 14 is reset to start a short exposure period. The mode of the image sensor can be set by the processor 34 through register 44 to determine whether the sensor should be in the low noise mode, or the extended dynamic range mode.

In block 402 a short exposure output signal is generated in the selected pixel and stored in the second capacitor 154 of the light reader circuit 16.

In block 404 the selected pixel is then reset. The level shifted reset voltage of the photodiode 100 is stored in the first capacitor 152 of the light reader circuit 16 as a reset output signal. The short exposure output signal is subtracted from the reset output signal in the light reader circuit 16. The difference between the short exposure signal and the reset signal is converted into a binary bit string by ADC 24 and stored into the external memory 38. The short exposure data corresponds to the first image pixel data. Then each pixel is again reset to start a long exposure period.

In block 406 the light reader circuit 16 stores a long exposure output signal from the pixel in the second capacitor 154. In block 408 the pixel is reset and the light reader circuit 16 stores the reset output signal in the first capacitor 152. The long exposure output signal is subtracted from the reset output signal, amplified and converted into a binary bit string by ADC 24 as long exposure data.

Referring to FIG. 10, in block 410 the short exposure data is retrieved from memory 38. In block 412 the short exposure data is combined with the long exposure data by the processor 34. The data may be combined in a number of different manners. The external processor 34 may first analyze the image with the long exposure data. The photodiodes may be saturated if the image is too bright. This would normally result in a "washed out" image. The processor 34 can process the long exposure data to determine whether the image is washed out, if so, the processor 34 can then use the short exposure image data. The processor 34 can also use both the long and short exposure data to compensate for saturated portions of the detected image.

By way of example, the image may be initially set to all zeros. The processor 34 then analyzes the long exposure data. If the long exposure data does not exceed a threshold then N least significant bits (LSB) of the image is replaced with all N bits of the long exposure data. If the long exposure data does exceed the threshold then N most significant bits (MSB) of the image are replaced by all N bits of the short exposure data. The image data is N+M bits per pixel. This technique increases the dynamic range by M bits, where M is the exponential in an exposure duration ratio of long and short exposures that is defined by the equation $l=2^M$. The replaced image may undergo a logarithmic mapping to a final picture of N bits in accordance with the mapping equation $Y=2^N \log_2(X)/(N+M)$.

FIG. 11 shows the timing of data generation and retrieval for the long and short exposure data. The reading of output signals from the pixel array 12 overlap with the retrieval of signals from memory 38. FIG. 11 shows timing of data generation and retrieval wherein a n-th row of pixels starts a short exposure, the (n-k)-th row ends the short exposure period and starts the long exposure period, and the (n-k-l)-th row of pixels ends the long exposure period. Where k is the short exposure duration in multiples of the line period, and l is the long exposure duration in multiples of the line period.

The processor 34 begins to retrieve short exposure data for the pixels in row (n-k) at the same time as the (n-k-l)-th row in the pixel array is completing the long exposure period. At the beginning of a line period, the light reader circuit 16 retrieves the short exposure output signals from the (n-k)-th row of the pixel array 12 as shown by the enablement of signals SAM1, SAM2, SEL(n-k) and RST (n-k). The light reader circuit 16 then retrieves the long exposure data of the (n-k-l)-th row.

The dual modes of the image sensor 10 can compensate for varying brightness in the image. When the image brightness is low the output signals from the pixels are relatively low. This would normally reduce the SNR of the resultant data provided by the sensor, assuming the average noise is relatively constant. The noise compensation scheme shown in FIGS. 4 and 5 improve the SNR of the output data so that the image sensor provides a quality picture even when the subject image is relatively dark. Conversely, when the subject image is too bright the extended dynamic range mode depicted in FIGS. 10 and 11 compensates for such brightness to provide a quality picture. Although a process having a short exposure followed by a long exposure is shown and described, it is to be understood that the short exposure may follow the long exposure.

Figure 12:
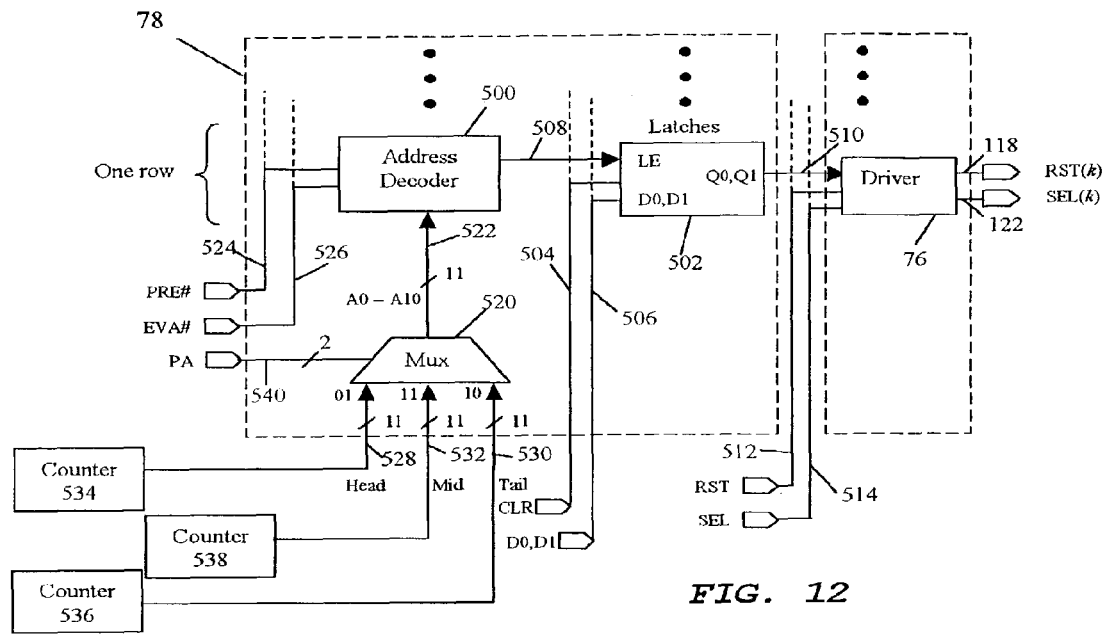
FIG. 12 is a schematic of an embodiment of a row decoder of the image sensor.

FIG. 12 shows an embodiment of a row driver 76 and a decoder 78 of the row decoder 20. The decoder 20 may contain an address decoder 500 and a latch 502. The input of the latch 502 is connected to input lines CLR 504, D0, D1 506 from the phase decoder circuit 84 (see FIG. 1) and the output line LE 508 of the address decoder 500. Although a phase decoder circuit 84 is shown and described, it is to be understood that any state value generator may be utilized. The input of the driver 76 is connected to output lines Q0, Q1 510 of the latch 502 and input lines RST 512 and SEL 514 from the phase sequence decoder 84. The latches 502 for each row of pixels are all connected to the phase decoder circuit 84 by the same common control lines 504 and 506. The common control lines 504 and 506 minimize the lines, transistors and space required by the row decoder while providing a means for loading the state valves with a time division multiplexing process.

The address decoder 500 is coupled to a multiplexor 520 by an address bus 522. The address decoder 500 is also connected to control lines PRE# 524 and EVA# 526 from the phase sequence decoder 84. The multiplexor 520 may have three input address busses 528, 530 and 532. The address busses 528, 530 and 532 are connected to a first counter 534, a second counter 536 and a third counter 538, respectively. Although counters 534, 536 and 538 are shown and described, it is to be understood that any address generator may be implemented.

The output of the multiplexor 520 is switched between the busses 528, 530 and 532 by a control line PA 540 from the phase sequence decoder 84. There is a corresponding address decoder 500 and latch 502 for each row of the pixel array 12. The multiplexor 520 provides a time division multiplexing means for selecting a row of the pixel array with a reduced number of lines and transistors which minimizes the size of the image sensor.

Figure 13:
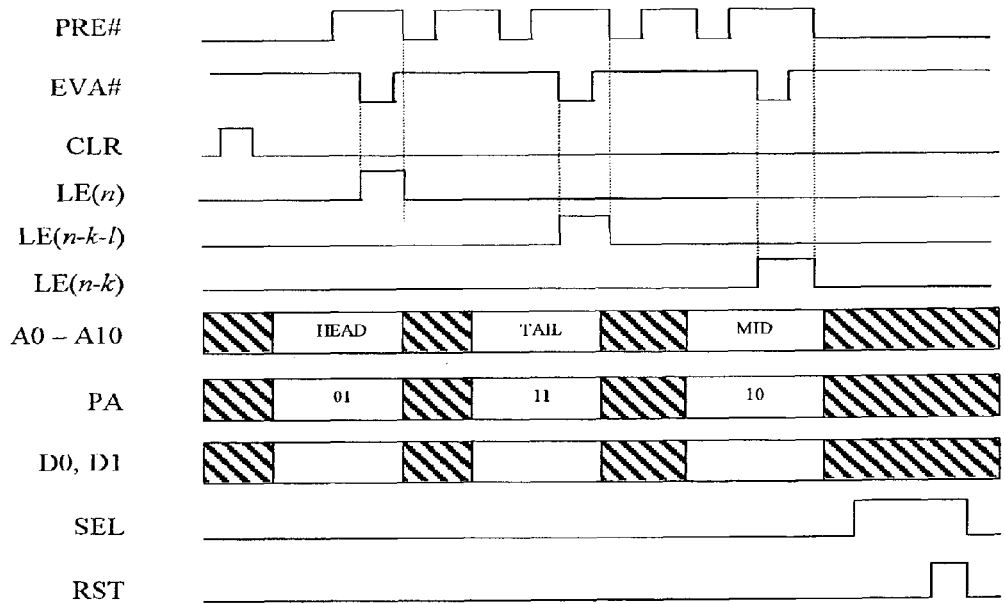
FIG. 13 is a timing diagram for the row decoder shown in FIG. 12.
Figure 14:
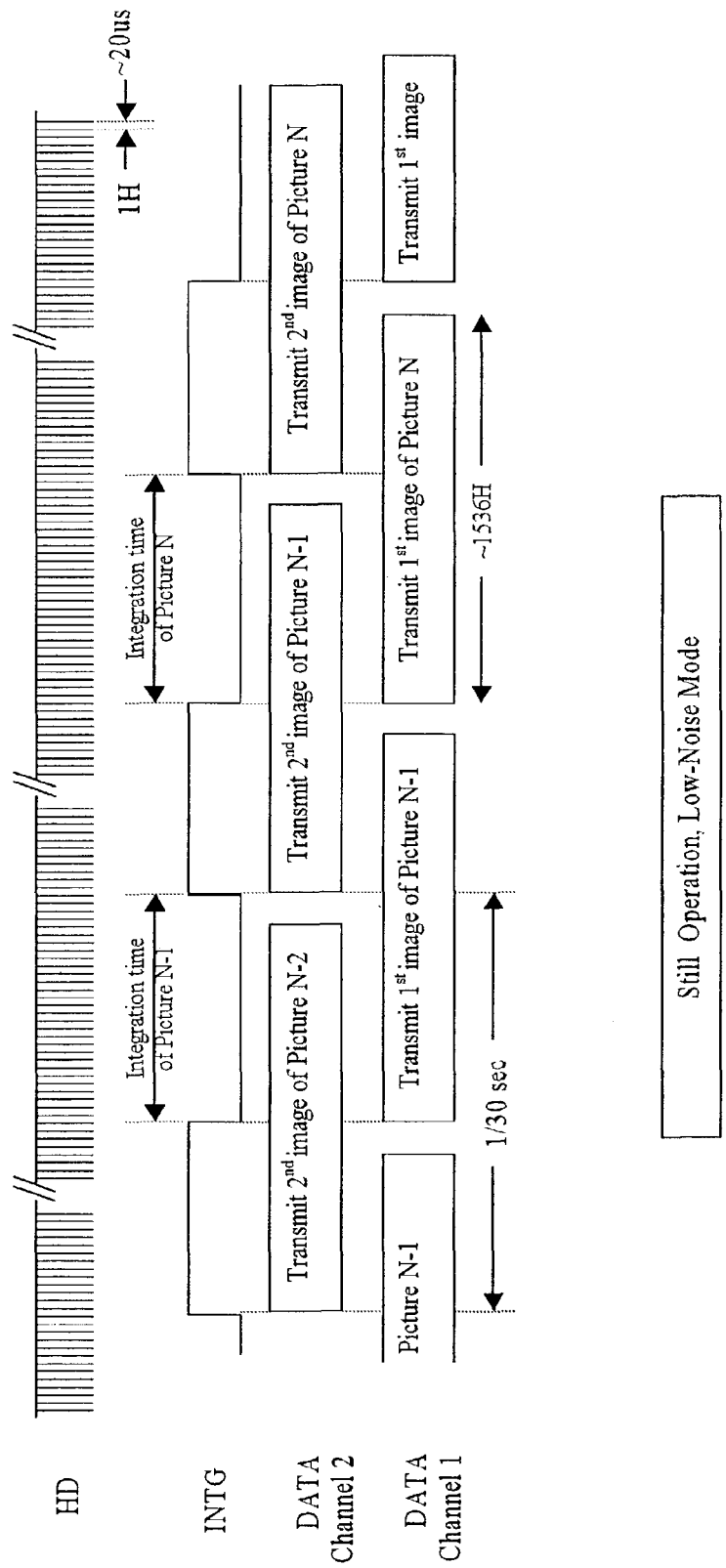
FIG. 14 is a timing diagram showing the transfer of pixel data when the image sensor is in a low noise mode.

FIGS. 13 and 14 show an operation of the row decoder 20 and transfer of pixel data. As shown in FIG. 14, the integration time and transfer of data is dependent on the control signal INTG from the processor 34. Making the integration time and data transfer dependent on the control signal INTG allows the processor 34 to control and vary these parameters.

The INTG control signal contains a plurality of pulses each with a falling edge and a rising edge. Referring to FIGS. 1, 12, 13 and 14, a falling edge is detected by the wide pulse detector 88, which generates an output on the LEAD control line 92. The LEAD control signal starts the first counter 534. The first counter 534 outputs an address that is provided to the multiplexor 520.

The PA control signal switches some of the multiplexors 520 to provide the address from the first counter 534 to the corresponding address decoders 500. If the address from the first counter 534 matches a stored address within the address decoder 500 the decoder 500 will enable the latch 502 through line LE 508. The latch 502 loads state values Q0 and Q1 into the row driver 76. The output state values correspond to state values D0 and D1 that were previously loaded into the latch 502 from the phase sequence decoder 84. When in low noise mode the state values allow for the RST and SEL signals to pass through the driver 76 to the selected row to generate and retrieve reference and reset signals, the first image.

The first counter 534 continues to output new address values which in turn sequentially select rows of the pixel array 12 to allow for the generation and retrieval of reference and noise signals for each row. The falling edge of the INTG control signal also enables the transfer of the first image to the processor 34 from the data interface 32. The process continues until all of the first image data is transferred to the processor 34, and stored in memory 38.

A rising edge of a pulse is detected by the wide pulse detector 88 which generates an output on the LAG control line 94. The LAG signal initiates the second counter 536. The second counter 536 provides addresses that are provided to the multiplexors 520 of each row. The multiplexors 520 mux the addresses to the decoders 500. If the addresses match, the latch 502 is enabled to load state values into the row drivers 76. When in the low noise mode the state values allow for the generation and retrieval of light response and reference signals for the second image. The rising edge also enables the data interface 32 to transfer the second image data to the processor 34. As shown in FIG. 14, the transfer of first and second image data may overlap. The interface 32 can transfer the overlapping data to the processor 34 in an interleaving manner.

Figure 15:
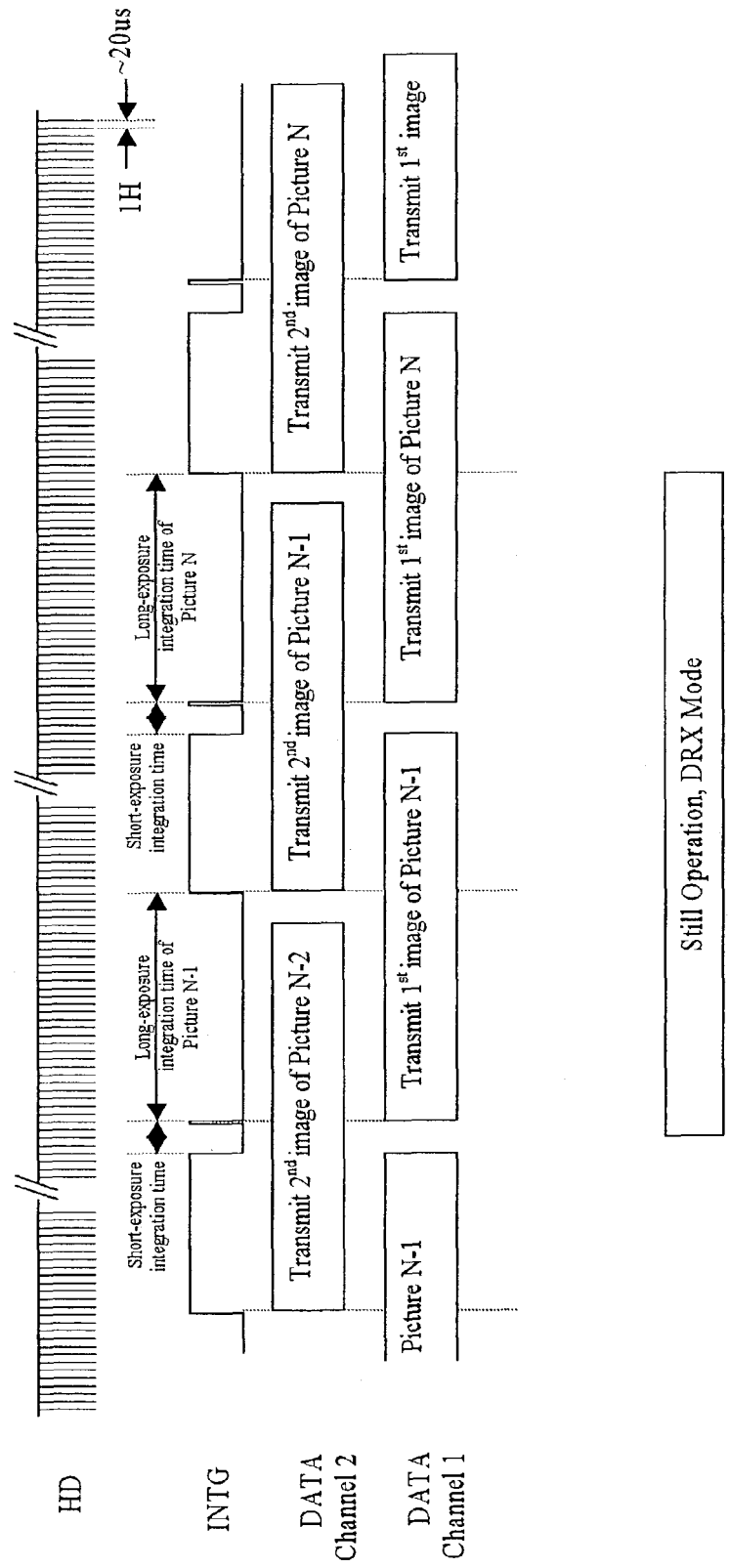
FIG. 15 is a timing diagram showing the transfer of pixel data when the image sensor is in an extended dynamic range mode.

FIG. 15 shows the transfer of data when the image sensor 10 is in the extended dynamic range mode. In this mode the INTG control signal includes a narrow pulse between wide pulses. Short exposure is initiated by the falling edge of a wide pulse. The narrow pulse is detected by the narrow pulse detector 90 which initiates the third counter 538. The third counter 538 provides addresses which are decoded by matching decoders 500 to enable corresponding latches 502. The enabled latches 502 load state values into the row drivers 76 that allow for the generation and retrieval of long exposure and reference signals of the second image. The narrow pulse also enables the data interface 32 to transfer the short exposure and reference signals of the first image to the processor 34.

The processor 34 can change the exposure time by varying the width of the pulses in the control signal. The variation in pulse width is an integer multiple of the line period so that the change in pulse width is in synchronization with the signals generated by the phase sequence decoder 82. When in the extended dynamic range mode the exposure time can be varied by changing the location of the narrow pulse.

Figure 16:
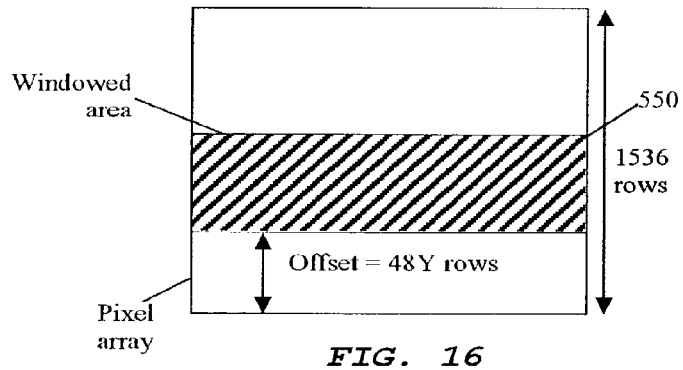
FIG. 16 is an illustration of a window of the pixel array.

As shown in FIG. 16, the image sensor may generate data within a window 550 of the pixel array 12. The window 550 is an area typically offset from the first row of the pixel array 12. The window information may be provided to the processor 34 to auto-focus the camera. In auto-focus mode the window offset may vary to capture different parts of the image.

Figure 17:
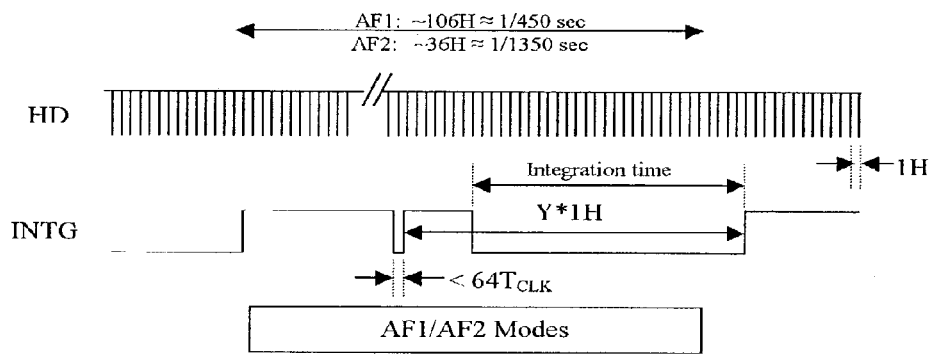
FIG. 17 is timing diagram showing an embedded narrow pulse used to determine a start location of the window.

FIG. 17 shows an INTG control signal with an in embedded narrow pulse that is used to determine the offset location of the window 550. When the register 44 sets the image sensor in a window mode, the narrow pulse detector 90 detects the embedded narrow pulse and provides a START control signal to the counter/latch 82 on the NP control line 96. The wide pulse detector 88 detects the rising edge of the next pulse and provides a STOP control signal to the counter/latch 82 on the LAG control line 94. The counter/latch 82 uses the START and STOP control signal to determine the offset for the window. An offset value is loaded into the counters 534, 536 and 538 to provide an initial count value. The processor 34 can control the window offset by varying the location of the embedded narrow pulse within the control signal.

It is the intention of the inventor that only claims which contain the term "means" shall be construed under 35 U.S.C. §112, sixth paragraph.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An image sensor that is connected to a processor that inputs digital image data for an image detected by the image sensor and outputs a plurality of control signal edges to the image sensor, the control signal edges including a first signal edge separated from a second signal edge by a control interval, comprising:
    a pixel array that includes a plurality of rows of pixels and generates the image; and,
    a selection circuit that selects a row of said pixel array to generate and retrieve pixel data from said pixel array by resetting and reading said row of said pixel array, a time interval between the resetting and reading of said row being controlled by the control interval.

2. The image sensor of claim 1, wherein said selection circuit includes:
a decoder circuit coupled to select a row of said pixel array;
a row address generator coupled to provide a row address to said decoder circuit; and
a detector circuit coupled to detect a signal edge included in the plurality of control signal edges and thereupon to output a signal to said row address generator.

3. The image sensor of claim 2, wherein said row address generator includes a first address generator that responds to the first signal edge and a second address generator that responds to the second signal edge, and the first and second address generators are configured to provide row addresses to said decoder circuit.

4. The image sensor of claim 3, wherein said row address generator further includes:
a third address generator that responds to a third edge included in the plurality of control signal edges, an output of the third address generator being selectable over outputs of the first and second address generators by a multiplexor.

5. The image sensor of claim 3, wherein said row address generator further includes:
a multiplexor that is coupled to select between at least said first and second address generators.

6. The image sensor of claim 1, wherein the selection circuit also selects another row of said pixel array for resetting and reading, a second time interval between the resetting and reading of said other row being controlled by a second control interval delimited by a third edge included among the plurality of control signal edges, the resetting of said row happening between the resetting and reading of said other row, the control interval and the second control interval having different durations.

7. An image sensor that is connected to a processor that inputs digital image data for an image detected by the image sensor and outputs a plurality of control signal pulses to the image sensor including a first pulse that has a first width and a second pulse that has a different second width, comprising:
a pixel array that includes a plurality of rows of pixels and detects the image; and,
a selection circuit that selects a group of multiple rows of said pixel array, the group being determined by a location of the second pulse relative to the first pulse.

8. The image sensor of claim 7, wherein said selection circuit includes:
a decoder circuit coupled to select rows of said pixel array;
a first address generator coupled to provide a first address to said decoder circuit; and
a detector circuit coupled to detect an edge included in the plurality of control signal pulses output by the processor and to output a signal to said first address generator upon detecting the edge.

9. The image sensor of claim 8, wherein said first address generator responds to a first edge included in the plurality of control signal pulses and said selection circuit further includes:
a second address generator that responds to a second signal edge included in the plurality of control signal pulses,
wherein the second address generator provides a second address to said decoder circuit.

10. The image sensor of claim 9, wherein said selection circuit further includes:
a third address generator that responds to a third edge included in the plurality of control signal pulses.

11. The image sensor of claim 9, wherein said selection circuit further includes:
a multiplexor coupled to select between at least said first and second address generators.

12. An image sensor, comprising:
a pixel array that contains a plurality of rows of pixels;
an address decoder coupled to select a row of said pixel array;
a first row address generator;
a second row address generator; and
a multiplexor coupled to select between at least the first and second row address generators to provide a row address to the address decoder.

13. The image sensor of claim 12, further comprising:
a detector circuit coupled to start/stop said first and second row address generators in response to signal edges provided by a processor that receives digital image data for an image generated from the pixel array.

14. The image sensor of claim 12, further comprising:
a third row address generator whose output is selectable by the multiplexor over outputs of the first and second row address generators.

* * * * *